US012581231B2

(12) United States Patent
Lu et al.

(10) Patent No.: US 12,581,231 B2
(45) Date of Patent: Mar. 17, 2026

(54) COAXIAL LOUDSPEAKER WITH HORN AND SHAPE OPTIMIZATION METHOD THEREFOR

(71) Applicant: SUZHOU SONAVOX ELECTRONICS CO., LTD., Jiangsu (CN)

(72) Inventors: Mingwei Lu, Jiangsu (CN); Guoqiang Chai, Jiangsu (CN); Renfang Xu, Jiangsu (CN); Xiafeng Xue, Jiangsu (CN)

(73) Assignee: Suzhou Sonavox Electronics Co., Ltd., Suzhou (CN)

( * ) Notice: Subject to any disclaimer, the term of this patent is extended or adjusted under 35 U.S.C. 154(b) by 362 days.

(21) Appl. No.: 18/257,205

(22) PCT Filed: Jul. 5, 2021

(86) PCT No.: PCT/CN2021/104529
§ 371 (c)(1),
(2) Date: Jun. 13, 2023

(87) PCT Pub. No.: WO2022/127081
PCT Pub. Date: Jun. 23, 2022

(65) Prior Publication Data

US 2024/0015431 A1 Jan. 11, 2024

(30) Foreign Application Priority Data

Dec. 14, 2020 (CN) ........................ 202011463139.1

(51) Int. Cl.
*H04R 1/30* (2006.01)
*H04R 1/24* (2006.01)

(52) U.S. Cl.
CPC ................ *H04R 1/30* (2013.01); *H04R 1/24* (2013.01)

(58) Field of Classification Search
CPC .................................. H04R 1/30; H04R 1/24
See application file for complete search history.

(56) References Cited

U.S. PATENT DOCUMENTS

2013/0064414 A1* 3/2013 Flavignard .............. H04R 1/30 381/412
2020/0077180 A1* 3/2020 Bezzola ................ G10K 11/28

FOREIGN PATENT DOCUMENTS

CN 2387687 Y 7/2000
CN 2595118 Y 12/2003
CN 202150931 U 2/2012
(Continued)

OTHER PUBLICATIONS

English machine translation of CN-209861159-U (Zhou et al.; A Coaxial Speaker; published Dec. 2019) (Year: 2019).*
(Continued)

*Primary Examiner* — Mark Fischer
(74) *Attorney, Agent, or Firm* — Knobbe, Martens, Olson & Bear, LLP

(57) ABSTRACT

A coaxial loudspeaker with a horn and a shape optimization method therefor are provided. The coaxial loudspeaker includes: a woofer unit; a tweeter unit; and a horn having an inner cavity, an open upper end and an open lower end. The tweeter unit comprises a high-pitch cone, the horn surrounds the high-pitch cone, a lower end portion of the horn is connected to the tweeter unit, and an upper end portion of the horn has the largest inner diameter.

15 Claims, 9 Drawing Sheets

(56) References Cited

FOREIGN PATENT DOCUMENTS

| | | | | |
|---|---|---|---|---|
| CN | 104408227 | A | | 3/2015 |
| CN | 108737937 | A | | 11/2018 |
| CN | 109145514 | A | | 1/2019 |
| CN | 209861159 | U | * | 12/2019 |
| CN | 112995847 | A | | 6/2021 |

OTHER PUBLICATIONS

International Search Report and Written Opinion issued for International Patent Application No. PCT/CN2021/104529, dated Sep. 24, 2021 including English translation of ISR in 15 pages.

* cited by examiner

COAXIAL LOUDSPEAKER WITH HORN AND SHAPE OPTIMIZATION METHOD THEREFOR

CROSS-REFERENCE TO RELATED APPLICATIONS

This application is the U.S. National Phase under 35. U.S.C. § 371 of International Application PCT/CN2021/104529, filed Jul. 5, 2021, which claims priority from Chinese Patent Application No. CN 202011463139.1 filed on Dec. 14, 2020 The disclosures of the above-described applications are hereby incorporated by reference in their entirety.

FIELD OF TECHNICAL

The present disclosure belongs to the field of loudspeaker, and specifically relates to a coaxial loudspeaker with a horn and a shape optimization method therefor.

BACKGROUND

The coaxial loudspeaker integrates a tweeter unit and a woofer unit, which are responsible for reproducing high notes and mid-bass, respectively. The advantage of coaxial loudspeaker is that the bandwidth of a single loudspeaker is greatly improved, and it is widely used in auto audio. At present, a few high-quality vehicle-mounted loudspeaker audio systems sometimes only use the tweeter unit of the coaxial loudspeaker and leave the woofer unit silent to adjust the sound field in the car. This also leads to the need for the tweeter unit to have a good frequency response curve when it works alone. However, in a coaxial loudspeaker, the woofer unit will inevitably affect the radiated sound field of the tweeter unit.

SUMMARY

One aspect relate to a coaxial loudspeaker with a horn, which has a better frequency response curve when only the tweeter unit works, while reducing the influence of the woofer unit on the sound field of the tweeter unit. Another aspect relates to a shape optimization method for a coaxial loudspeaker with a horn, which can quickly and accurately optimize the shape of the horn, and improve the acoustic performance of a loudspeaker.

A first aspect of the present disclosure provides a coaxial loudspeaker comprising a woofer unit and a tweeter unit, and the coaxial loudspeaker further comprising a horn having an inner cavity, an open upper end and an open lower end, wherein the tweeter unit comprises a high-pitch cone; and the horn surrounds the high-pitch cone, a lower end portion of the horn is connected to the tweeter unit, and an upper end portion of the horn has the largest inner diameter.

In an embodiment, the horn has an expansion portion, and inner diameter of the expansion portion increases gradually from bottom to top. More preferably, a cross section of the expansion portion in an up-down direction has two mirror-symmetrical Bezier curve-shaped inner contours. This causes the frequency response curve of high frequencies being smoother.

In an embodiment, inner diameter of the horn increases gradually from bottom to top. More preferably, the cross section of the horn in the up-down direction has two mirror-symmetrical Bezier curve-shaped inner contours. This causes the frequency response curve of high frequencies being smoother.

In an embodiment, the tweeter unit further comprises a seat, the seat is arranged on the woofer unit, the high-pitch cone is arranged on the seat, and the lower end portion of the horn is connected to the seat and/or an outer peripheral edge of the high-pitch cone.

In an embodiment, a part of a lower end surface of the horn has an arched portion that is arched upward, and an edge portion of the high-pitch cone is located below the arched portion and an annular cavity communicating with the inner cavity is formed therebetween. This causes the frequency response curve of high frequencies being smoother.

In an embodiment, the tweeter unit further comprises a high-pitch voice coil and a plurality of soldering terminals for transmitting an audio signal to the high-pitch voice coil, an upper portion of each of the plurality of soldering terminals is embedded in the seat and is in contact and communicated with an inputting end of the high-pitch voice coil, and the plurality of soldering terminals are electrically connected to a signal inputting line for inputting audio signals.

In an embodiment, the woofer unit comprises a bass voice coil, and a lead wire of the bass voice coil is electrically connected to the signal inputting line.

In an embodiment, the woofer unit comprises a magnetic circuit system, the magnetic circuit system is provided with a through hole extending in an up-down direction, the signal inputting line is inserted into the through hole, and a lower portion of each of the plurality of soldering terminals extends into the through hole to be electrically connected with the signal inputting line.

In an embodiment, the coaxial loudspeaker further comprises a dust ring connected between the horn and the woofer unit.

In an embodiment, the woofer unit comprises a bass cone, and the dust ring is connected between the horn and the bass cone, further, the dust ring is made of breathable material, for woofer unit magnetic gap dustproof.

In an embodiment, a cross section of the dust ring in an up-down direction comprises two mirror-symmetrical wave or zigzag shapes to avoid pulling the bass cone when the woofer unit works.

In an embodiment, the breathable material is cotton, PC (polycarbonate) or CONEX (aramid fiber). The dust ring is only used for dust protection, not waterproof.

In an embodiment, the woofer unit comprises a bass voice coil, the tweeter unit is arranged within the woofer voice coil, and an uppermost end of the tweeter unit and the upper end of the horn are lower than an upper end of the woofer unit. The tweeter unit and the horn are integrally located within the woofer unit.

In an embodiment, the coaxial loudspeaker further comprises a plurality of fins extending inwardly from an inner surface of the horn, and the plurality of fins are located above the high-pitch cone of the tweeter unit. More preferably, the plurality of fins extend radially inward of the horn. Further, a radial dimension of the fins gradually increases from top to bottom. More further, the lower end portion of each of the plurality of fins is connected to an annular member. More further, an inner edges of the fins are arc-shaped. The fins can effectively protect the internal components of the tweeter unit and prevent foreign objects such as fingers from accidentally entering the tweeter unit and damage the internal components such as the high-pitch cone; the fins also enable better high-frequency diffusion.

Another aspect of the present disclosure provides a shape optimization method for a coaxial loudspeaker with a horn, comprises the following steps:

S1, establishing a geometric model of a coaxial loudspeaker as described above, and obtaining control nodes in a contour curve of the horn;

S2, setting physical field;

S3, defining material parameters;

S4, dividing mesh;

S5, optimizing geometric parameters of a contour shape of the horn;

S6, drawing an optimized geometric model of the horn according to optimized parameters; wherein, step S5 specifically comprises:

S51, selecting the optimization parameters: taking coordinate values P of a group of control nodes in the contour curve of the horn as the optimization parameters;

S52, setting constraints: limiting the value range C of coordinate values P to:

$$C=\{P:\text{lb}\le P\le ub\}$$

in the above equation, lb is lower limit of the coordinate values P, and ub is upper limit of the coordinate values P;

S53, determining optimization objective: taking a maximum value of a sum of high-frequency average sound pressure level responses $\overline{\text{SPL}^0}$ and $\overline{\text{SPL}^\theta}$ of the coaxial loudspeaker at 0° on axis and off-axis θ angles, that is, satisfying:

$$\check{P}=\underset{P}{\max}\left(\overline{SPL^0}+\overline{SPL^\theta}\right)$$

in the above equation, $\check{P}$ is a set of optimization parameters that satisfy the optimization objective;

$$\underset{P}{\max}$$

is an operator to solve the maximum value;

S54, optimizing calculation: according to the optimization parameters P and the constraint conditions C, using an optimization algorithm to calculate a set of optimization parameters $\check{P}$ that satisfy the optimization objective $$\underset{P}{\max}\left(\overline{SPL^0}+\overline{SPL^\theta}\right).$$

In an embodiment, step S2 specifically comprises:

S21, electromagnetic field and vibration system: setting fixed parts of the loudspeaker vibration system components to "Fixed Constraints"; setting material constitutive relation of the loudspeaker vibration system components to "Linear Elastic material Model"; setting an axial load FF on the loudspeaker voice coil, as follows:

$$FF=BL*\frac{V_0-BL*v}{Zb(freq)}$$

in the above equation, BL is driving force coefficient of the loudspeaker magnetic circuit, Zb(freq) is basic impedance frequency response curve of the loudspeaker magnetic circuit, ν is axial vibration velocity of the loudspeaker voice coil, and $V_0$ is the on-load voltage of the loudspeaker;

S22, sound field: setting a geometric model of the horn contour as "Hard Sound Field Boundary"; setting an outer layer of the air domain around the loudspeaker as "Perfect Matched Layer".

In step S1, the geometric model of the loudspeaker and its surrounding air domain is established in a finite element analysis software, a geometric model of the horn contour is established with the parameterized Bezier curve to obtain the control nodes in the curve, and the geometrical shape of the horn contour is controlled by the coordinate values of these control nodes.

In step S3, mechanical material parameters of each component of the loudspeaker vibration system are defined; material parameters of air are defined.

In step S4, the loudspeaker and its surrounding air domain are meshed with "Free Triangular Mesh" elements, and the size of the largest mesh element should meet the principle of at least 5 to 6 linear elements within one sound wavelength.

In step S54, the optimization algorithm is selected from seven gradient-free optimization algorithms, including Nelder-Mead, BOBYQA, COBYLA, Laplace, Winslow, Coordinate Search, and Yeoh smoothing, and three gradient-type optimization algorithms, including SNOPT, MMA and Levenberg-Marquardt.

The above steps are performed in the finite element analysis software, and the finite element analysis software comprises COMSOL Multiphysics and ANSYS.

The present disclosure adopts the above solutions, and has the following advantages over the prior art:

in the coaxial loudspeaker with the horn of the present disclosure, when the tweeter unit works, the high-pitch horn guides the sound wave to propagate forward, preventing the sound wave from radiating backward, thereby reducing the influence of the woofer unit on the high notes, and the configuration that gradually expands outward is beneficial to expanding the high frequency of the tweeter unit. The shape optimization method of the present disclosure designs the optimal Bezier curve shape of the horn through the optimization algorithm, which can quickly, cost-effectively and accurately optimize the loudspeaker horn, thereby shortening the development cycle of the loudspeaker horn and improving the acoustic performance of the loudspeaker.

BRIEF DESCRIPTION

For more clearly explaining the technical solutions in the embodiments of the present disclosure, the accompanying drawings used to describe the embodiments are simply introduced in the following. Apparently, the below described drawings merely show a part of the embodiments of the present disclosure, and those skilled in the art can obtain other drawings according to the accompanying drawings without creative work.

REFERENCE NUMBERS

1—woofer unit; 11—frame; 12—bass cone; 13—bass voice coil; 14—first magnetic circuit system; 141—T-yoke; 142—magnetic steel; 143—through hole; 15—signal inputting line; 16—damper;

2—tweeter unit; 21—seat; 22—high-pitch cone; 221—central arched portion; 222—edge arced portion; 23—high-pitch voice coil; 24—second magnetic circuit system; 25—soldering terminal;

3—horn; 31—arched portion; 310—annular cavity; 32—fin; 33—annular member; 4—dust ring.

DETAILED DESCRIPTION

In the following, the preferred embodiments of the present disclosure are explained in detail combining with the accompanying drawings so that the advantages and features of the present disclosure can be easily understood by the skilled persons in the art. It should be noted that the explanation on these implementations is to help understanding of the present disclosure, and is not intended to limit the present disclosure. Further, the technical features involved in the various embodiments of the present disclosure described below may be combined with each other if they do not conflict with each other.

In the description of the present disclosure, it should be noted that the orientation or positional relationship indicated by the terms "upper", "lower", "inner", "outer", and the like is based on the orientation or positional relationship shown in the accompanying drawings, is only for the convenience of describing the present disclosure and simplifying the description, rather than indicating or implying that the indicated device or element must have a particular orientation, be constructed and operate in a particular orientation, and therefore should not be construed as limiting the present disclosure.

In the description of the present disclosure, it should be noted that, unless otherwise expressly specified and limited, the terms "mount", "communicate", "connect", "fix" and other terms should be understood in a broad sense, for example, it may be fixedly connected or detachably connected, or integrated; it may be mechanically connected or electrically connected; it can be directly connected or indirectly connected through an intermediate medium, or it can be the internal communication of two elements. For those of ordinary skill in the art, the specific meanings of the above terms in the present disclosure can be understood according to specific situations.

Figure 1:
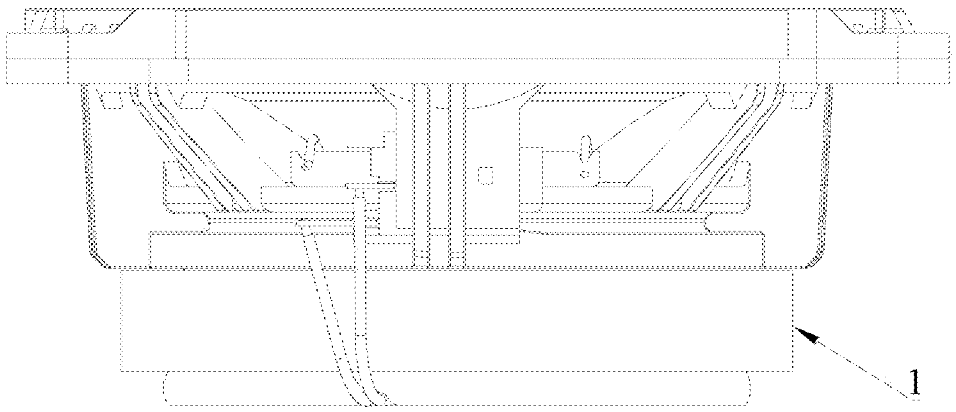
FIG. 1 is a schematic diagram of the overall appearance of a coaxial loudspeaker according to an embodiment of the present disclosure.
Figure 2:
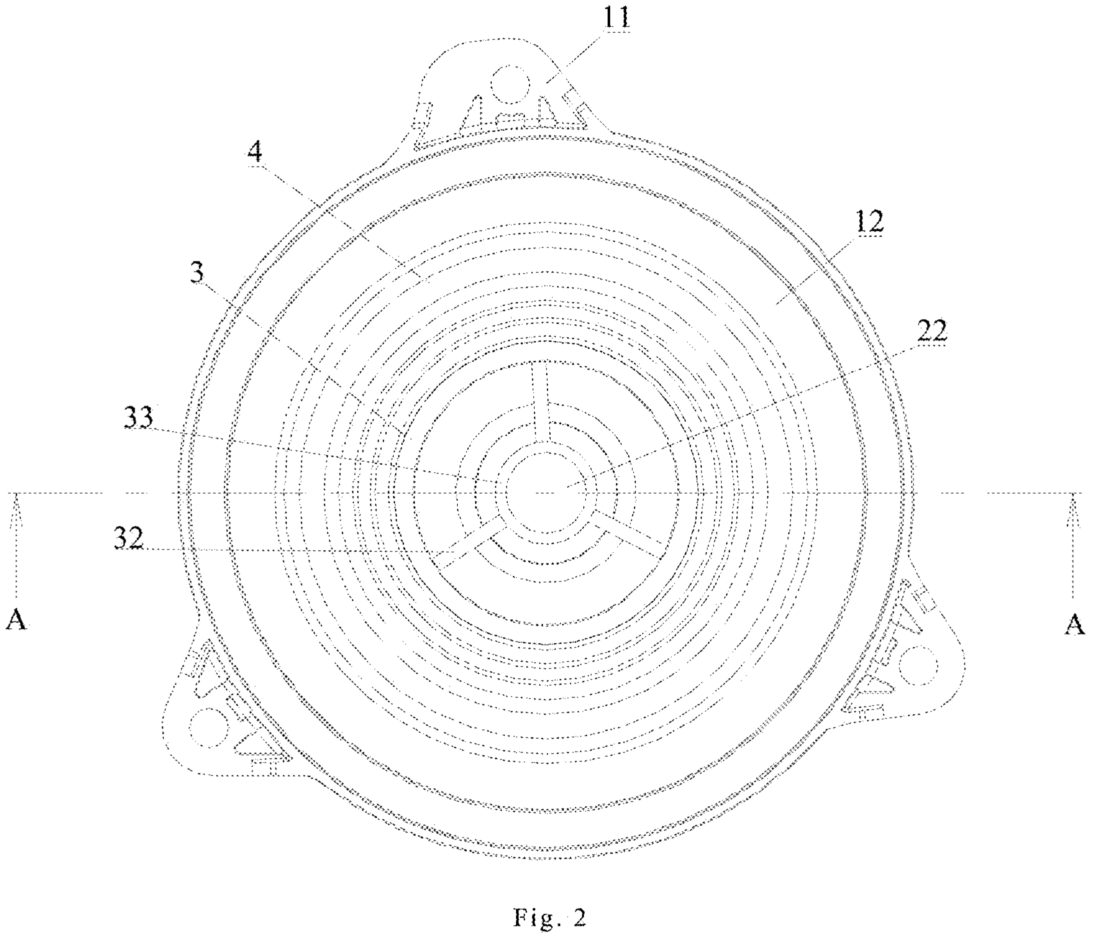
FIG. 2 is the top view of the coaxial loudspeaker shown in FIG. 1.
Figure 3:
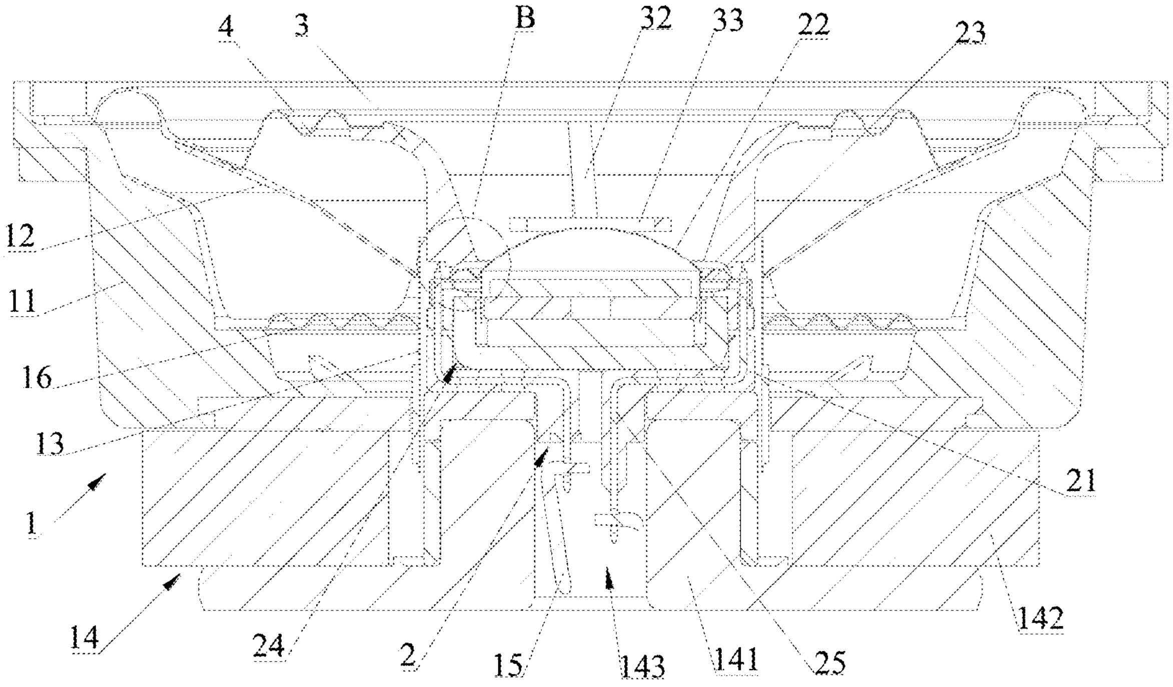
FIG. 3 is a section view along Line A-A in FIG. 2.

Referring to FIG. 1 to FIG. 6, the present embodiment provides a coaxial loudspeaker with a horn, which comprises a woofer unit 1 and a tweeter unit 2 that are coaxially arranged. The coaxial loudspeaker further comprises a horn 3 with an inner cavity, an open upper end and an open lower end. The above-mentioned tweeter unit 2 comprises a high-pitch cone 22, and the horn 3 surrounds the high-pitch cone 22. The lower end portion of the horn 3 is connected to the tweeter unit 2, and the upper end of the horn 3 is where its inner diameter is the largest. The horn 3 has an expansion portion, and the inner diameter of the expansion portion increases gradually from bottom to top. Further, the inner diameter of the horn 3 increases gradually from bottom to top, and the horn 3 is in a shape of gradually expanding outward as a whole. Specifically, the cross section of the horn 3 in the up-down direction has two mirror-symmetrical Bezier curve-shaped inner contours, so that the frequency response curve of high frequencies is smoother, as shown in FIG. 3. In another embodiment, the horn 3 may first contract inward and then gradually expand outward. The horn 3 significantly reduces the influence of the configuration of the woofer unit 1 on the sound field radiated by the tweeter unit 2. The horn can not only improve the acoustic impedance of the surface of the loudspeaker cone, thereby improving the sensitivity of the loudspeaker, but more importantly, it can broaden the directivity of the high-frequency sound field of the loudspeaker and improve the sound field effect.

The woofer unit 1 comprises a frame 11, a bass cone 12 and a first magnetic circuit system 14 arranged on the frame 11, a bass voice coil 13 connected to the bass cone 12, and a damper 13 sleeved on the bass voice coil 13. The first magnetic circuit system 14 forms a magnetic gap for the bass voice coil 13 to be inserted into, the lower end of the bass voice coil 13 is inserted into the magnetic gap and vibrates up and down after being powered on, thereby driving the bass cone 12 to vibrate and produce sound. The outer peripheral edge of the damper 16 is fixed on the frame 11 to prevent the bass voice coil 13 from shaking horizontally.

The tweeter unit 2 is generally arranged within the voice coil of the woofer unit 1. The uppermost end of the tweeter unit 2 and the upper end of the horn 3 are both lower than the upper end of the woofer unit 1, and the tweeter unit 2 and the horn 3 are integrally located within the woofer unit 1, so as not to increase the volume of the coaxial loudspeaker and its occupied space.

The woofer unit 2 further comprises a seat 21 arranged on the woofer unit 1, the above high-pitch cone 22 and a second magnetic circuit system 24 arranged on the seat 21, and a high-pitch voice coil 23 connected to the high-pitch cone 22. The second magnetic circuit system 24 forms a magnetic gap for the high-pitch voice coil 23 to be inserted into, the lower end of the high-pitch voice coil 23 is inserted into the magnetic gap and vibrates up and down after being powered on, thereby driving the high-pitch cone 22 to vibrate and produce sound.

The seat 21 is specifically arranged on the first magnetic circuit system 14 of the woofer unit 1. The first magnetic circuit system 14 specifically comprises a T-yoke 141 and a magnetic steel 142 sleeved on the T-yoke 141, and the magnetic steel 142 surrounds the T-yoke 141 and forms a magnetic gap. The seat 21 is arranged on the upper portion of the T-yoke 141. Specifically in this embodiment, the T-yoke 141 is provided with a through hole 143 extending in the up-down direction. The lower portion of the seat 21 is inserted into the through hole 143.

The tweeter unit 2 further comprises a plurality of soldering terminals 25 for transmitting an audio signal to the high-pitch voice coil 2. The upper portion of each soldering terminal 25 is embedded in the seat 21 and is in contact and communicated with the input end of the high-pitch voice coil 23, for example, through a lead wire; the lower portion of each soldering terminal 25 extends into the woofer unit 1 to be electrically connected with one of the signal inputting lines 15 for inputting audio signals. Specifically, the signal inputting lines 15 penetrate into the through hole 143, and the lower portion of each soldering terminal 25 extends into the through hole 143 and is electrically connected to one of the signal inputting lines 15. The signal inputting lines 15 are also electrically connected to the lead wires of the bass voice coil 13 to input audio signals to the woofer unit 1.

Figure 4:
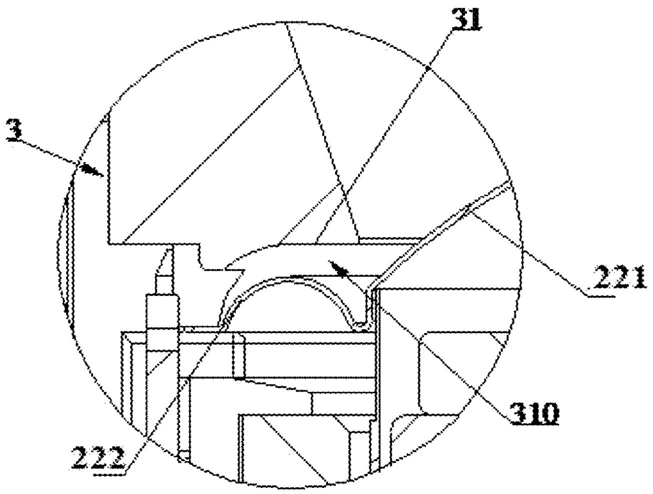
FIG. 4 is a partial enlarged view at Part B in FIG. 3.
Figure 5:
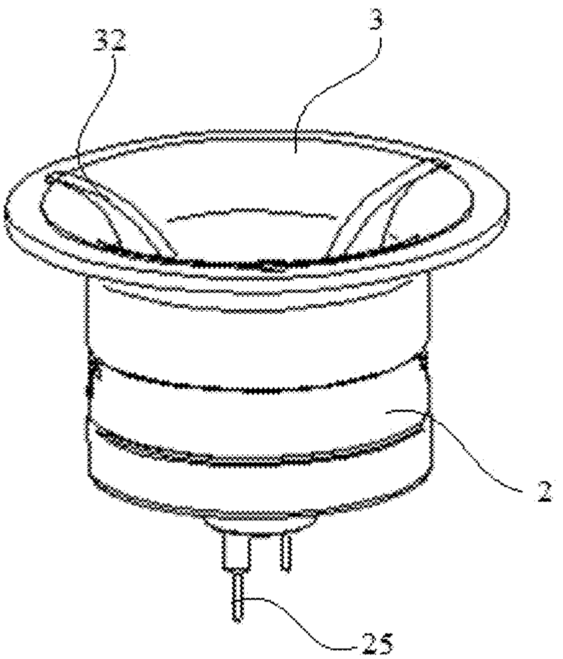
FIG. 5 is a schematic three-dimensional diagram of the tweeter unit and the horn shown in FIG. 2.
Figure 6:
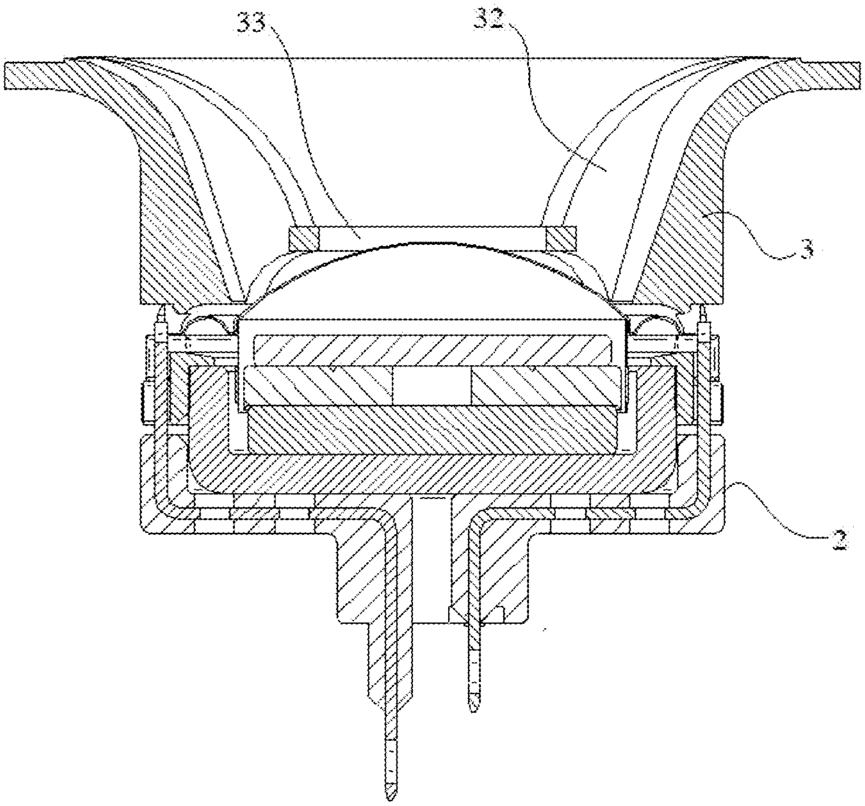
FIG. 6 is a section view of the tweeter unit and the horn shown in FIG. 2.

As shown in FIG. 3 and FIG. 4, the lower end portion of the horn 3 is specifically connected to the seat 21 and/or the outer peripheral edge of the tweeter cone 22. A part of the lower end surface of the horn 3 (the part near its inner side) has an arched portion 31 that is arched upward, and the edge portion of the high-pitch cone 22 is located below the arched portion 31 and an annular cavity 310 communicating with the inner cavity is formed therebetween, and this arrangement causes the frequency response curve of high frequencies smooth. Specifically, the high-pitch cone 22 comprises a central arched portion 221 that is arched upward and a circle of edge arched portions 222 surrounding the central arched portion 221, and the edge arch portion 222 is located below the arched portion 31 of the horn 3.

The coaxial loudspeaker further comprises a dust ring 4 connected between the horn 3 and the woofer unit 1. The dust ring 4 is specifically connected between the upper end portion of the horn 3 and the bass cone 12. The dust ring 4 is made of breathable material, for magnetic gap dustproof of the woofer unit 1. The cross section of the dust ring 4 in the up-down direction comprises two mirror-symmetrical wave or zigzag shapes to avoid pulling the bass cone 12 when the woofer unit 1 works. The breathable material is cotton, PC (polycarbonate) or CONEX (aramid fiber). The dust ring 4 is only used for dust protection, not waterproof.

Further, the coaxial loudspeaker further comprises a plurality of fins 32 extending inwardly from the inner surface of the horn 3, and the fins 32 are located above the high-pitch cone 22 of the tweeter unit 2. Specifically, the fins 32 extend radially inward of the horn 3, and the radial dimension of the fins 32 gradually increases from top to bottom. The lower end portion of each of the fins 32 is connected to an annular member 33. The inner edges of the fins 32 are arc-shaped. The fins 32 can effectively protect the internal components of the tweeter unit 2 and prevent foreign objects such as fingers from accidentally entering the tweeter unit 2 and damage the internal components such as the high-pitch cone 22; the fins 32 also enable better high-frequency diffusion.

Figure 7:
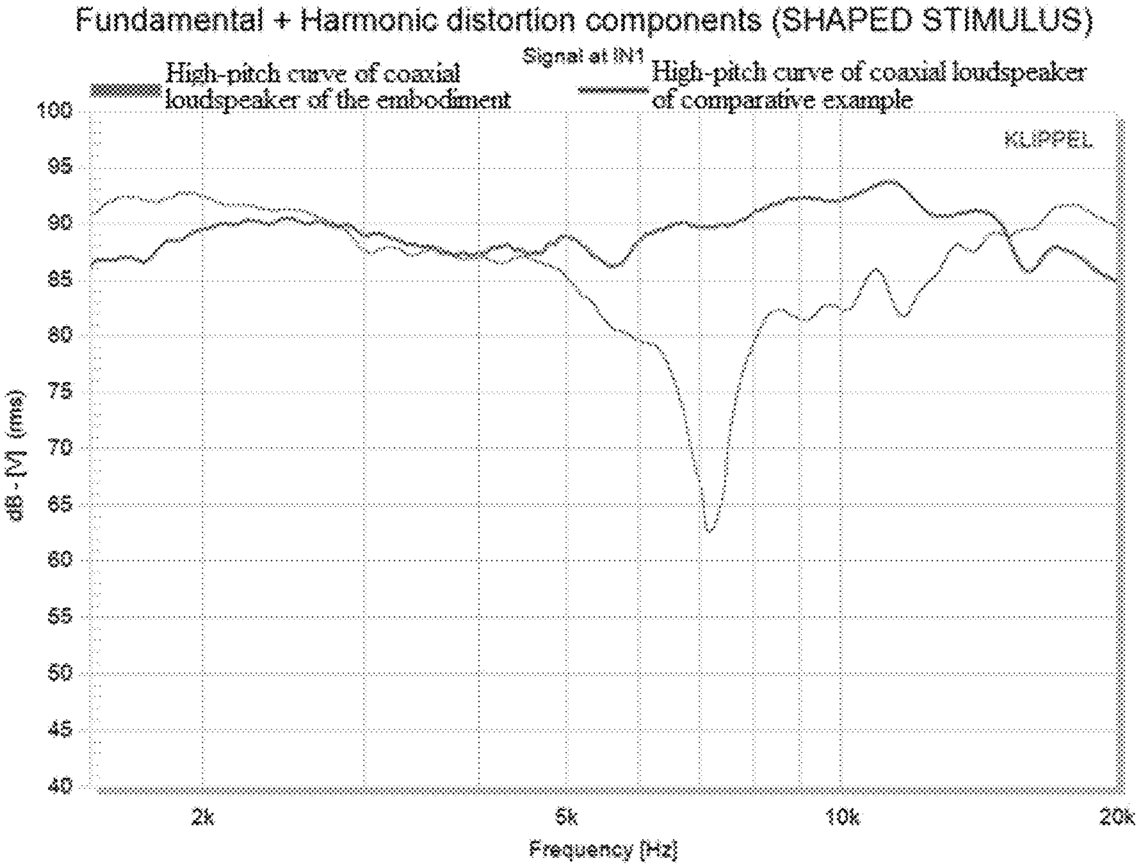
FIG. 7 is a comparison diagram of frequency response curves of a coaxial loudspeaker without a horn and a coaxial loudspeaker according to an embodiment of the present disclosure.

The frequency response test was performed on the coaxial loudspeaker without a horn (comparative example) and the coaxial loudspeaker with a horn in this embodiment, and the test results are shown in FIG. 7. The configuration of the coaxial loudspeaker of the comparative example is basically the same as that of the present embodiment, and the only difference is: the tweeter unit is not provided with a horn, and the dust ring is connected between the tweeter unit and the woofer unit. The thin line in FIG. 7 is the frequency response curve of the tweeter unit in the coaxial loudspeaker of the comparative example; the thick line in the FIG. is the frequency response curve of the tweeter unit in the coaxial loudspeaker of the present embodiment. It can be seen from the FIG. that the frequency response curve of the tweeter unit in the coaxial loudspeaker of this embodiment is more balanced.

The geometrical shape of the horn of the coaxial loudspeaker in this embodiment is directly related to the sound reproduction quality and sound field directivity characteristics of the loudspeaker. If the geometrical shape of the horn is designed using the traditional empirical method of designing products—trial production of samples—testing—improving design—re-trial production of samples—re-testing, the problem of the horn cannot be found until the later stage of design, and the development cycle is long and costly. Numerical simulation analysis method based on finite element to simulate and analyze the sound field response of loudspeakers under different shapes of horns was adopted, and although this method greatly shortens the product development cycle and reduces research and development costs, it still relies on repeated design, and often the theoretically optimal horn shape cannot be designed in the end. Based on this, the present embodiment provides a shape optimization method for a coaxial loudspeaker with a horn to solve the following problems: I. the traditional empirical design method of the loudspeaker horn has the problems of long development cycle and high cost; II. it is often difficult to design the theoretically optimal geometrical shape of the horn by means of the general loudspeaker sound field simulation analysis method.

Figure 8:
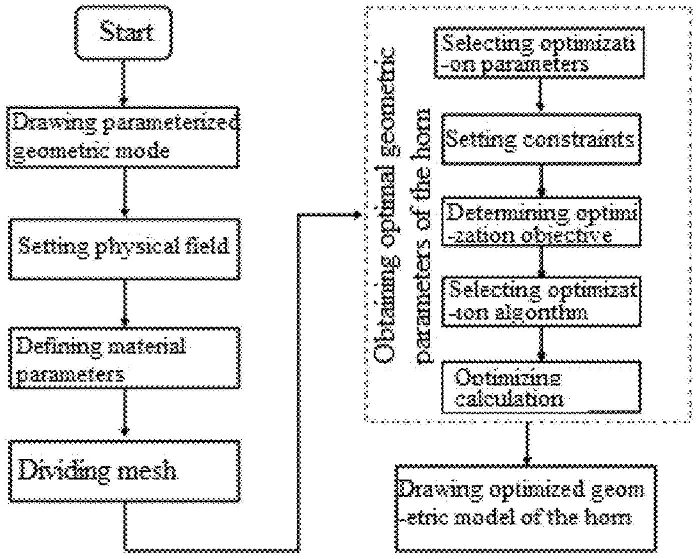
FIG. 8 is a flowchart of a shape optimization design method according to an embodiment of the present disclosure.
Figure 9:
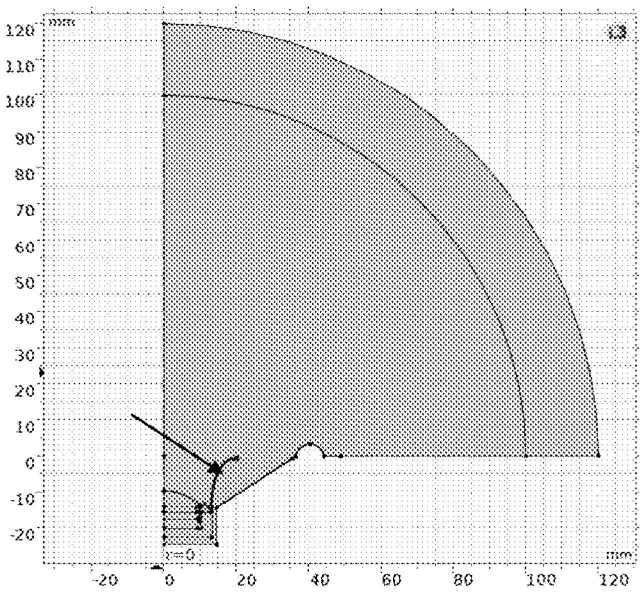
FIG. 9 is a geometric model of loudspeaker, horn, and its surrounding air.
Figure 10:
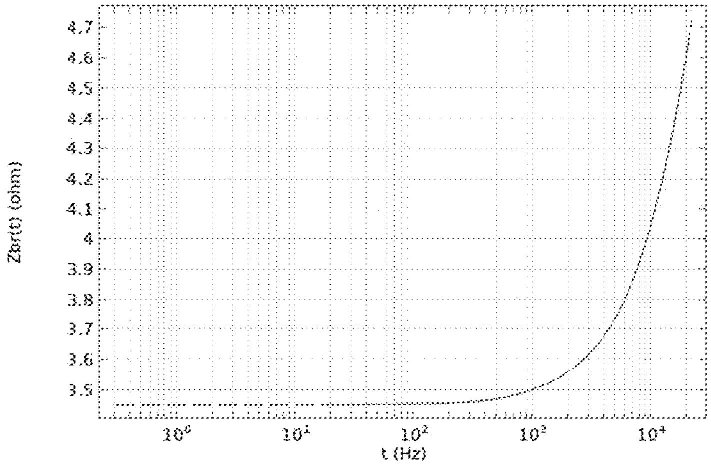
FIG. 10 shows the real part of the base impedance of the tweeter unit.
Figure 11:
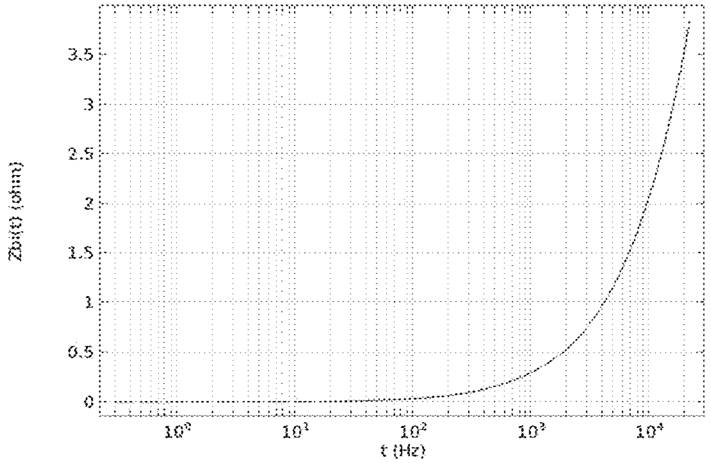
FIG. 11 shows the imaginary part of the base impedance of the tweeter unit.

Taking the tweeter of the above coaxial loudspeaker as an example, COMSOL Multiphysics 5.5 was used to optimize the design of its horn shape, and the optimized design results of the horn were directly given. FIG. 8 is a flow chart of the shape optimization method, which mainly comprises the following steps:

Step 1: due to that the tweeter unit of this coaxial loudspeaker has an axisymmetric configuration, in order to facilitate the calculation, first selecting the 2D axisymmetric analysis environment in the COMSOL software, and then selecting the physics interface as "Sound-Solid Interaction, Frequency Domain", and finally selecting "frequency domain study" due to that the frequency domain analysis of the three-field coupling is to be carried out;

Step 2: using the COMSOL software to establish the 2D axisymmetric geometric model of the tweeter unit, the surrounding air domain, and the diaphragm of the woofer unit, and to establish the geometric model of the horn contour with the parametrized cubic Bezier curve, as shown by the thick line indicated by the arrow in FIG. 9. The explanation of the geometric model is as follows: 1) the magnetic circuit system of the tweeter unit does not participate in the finite element calculation, and is only treated as a hard sound field boundary, and the driving force coefficient and basic impedance frequency response curve of the required magnetic circuit system can be obtained by additional simulation analysis or by measurement; 2) the diaphragm of the woofer unit does not participate in the finite element calculation, and is only treated as a hard sound field boundary; 3) the cubic Bezier curve represented by the dark curve is the horn contour, and the two endpoints of the curve are fixed, and the coordinate values of the two nodes in the middle of the curve are used as optimization parameters;

Step 3: defining functions, parameters and variables, including: 1) defining an average function on the voice coil and name it coil_av, which is to define the arithmetic mean of the reverse electromotive force in the voice coil domain; 2) importing the interpolation functions of the real part and the imaginary part of the basic impedance of the tweeter unit and name them Zbr and Zbi respectively, as shown in FIG. 10 and FIG. 11; 3) defining the coordinate parameters of the two nodes in the cubic Bezier curve as (P1r, P1z) and (P2r, P2z), and set their initial coordinates to (13.1, −10) [mm] and (14, −0.5) [mm]; 4) defining six variables as follows:

*Zb: Zbr*(freq)+*i*Zbi*(freq);

*FF: BL**(*V*0-*BL**coil_*av*(solid.*u_tZ*))/*Zb;*

Figure 12:
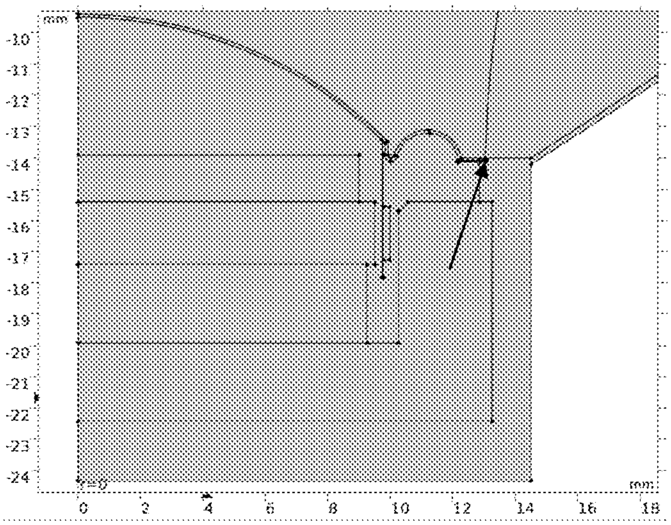
FIG. 12 shows the "Fixed Constraints" boundary.
Figure 13:
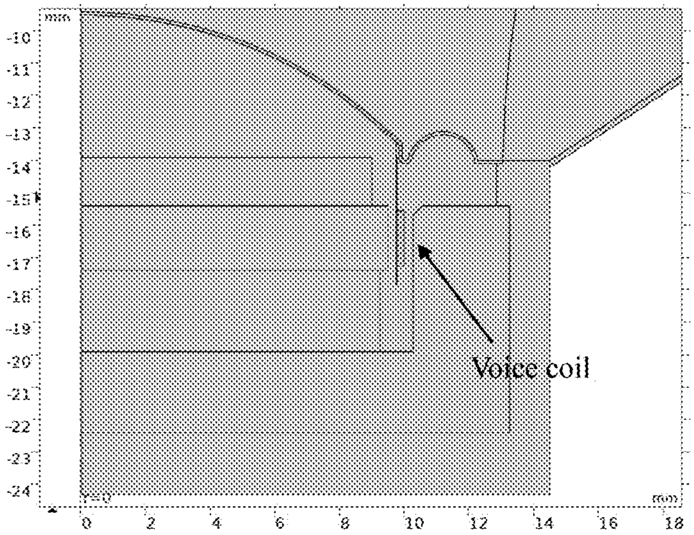
FIG. 13 shows the voice coil of the tweeter unit.
Figure 14:
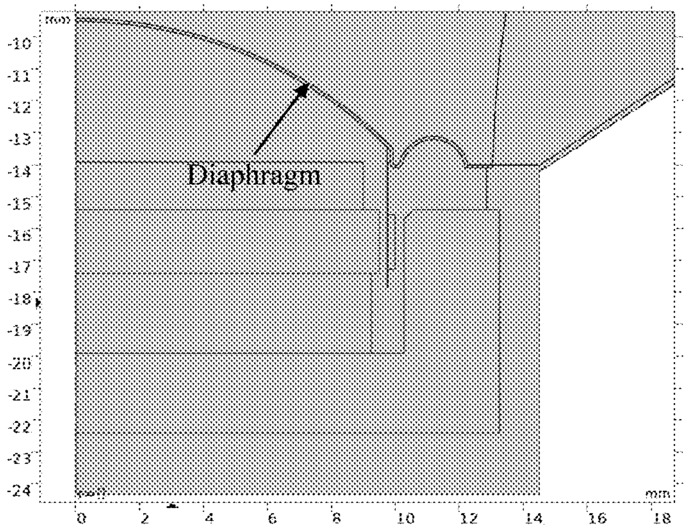
FIG. 14 shows the diaphragm of the tweeter unit.
Figure 15:
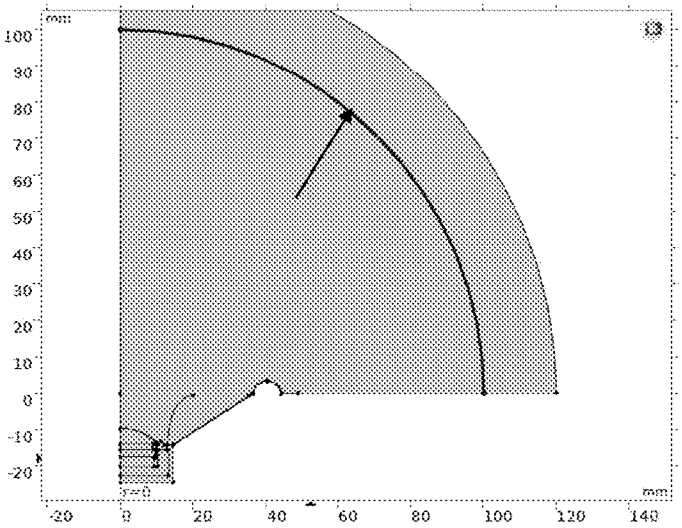
FIG. 15 shows the "Outfield Calculation" boundary.
Figure 16:
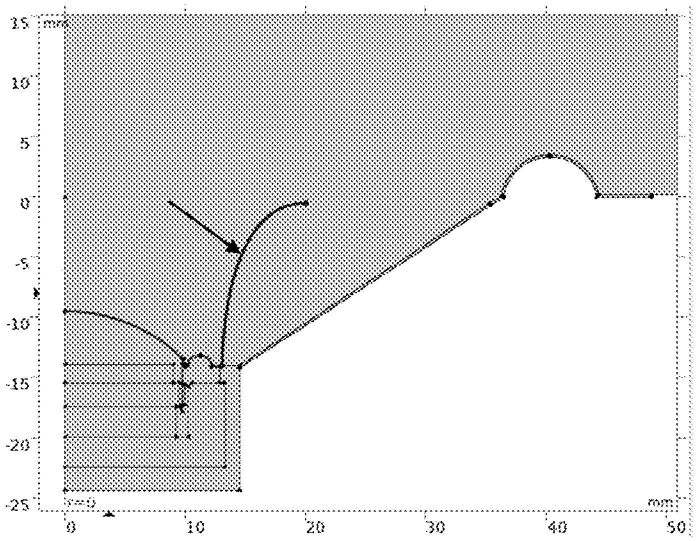
FIG. 16 shows the "Internal Hard Sound Field Boundary (Wall)"
Figure 17:
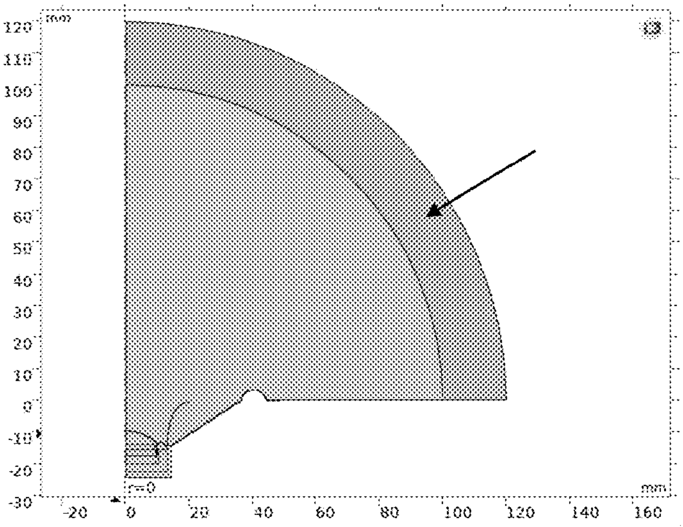
FIG. 17 shows a perfectly matched layer.
Figure 18:
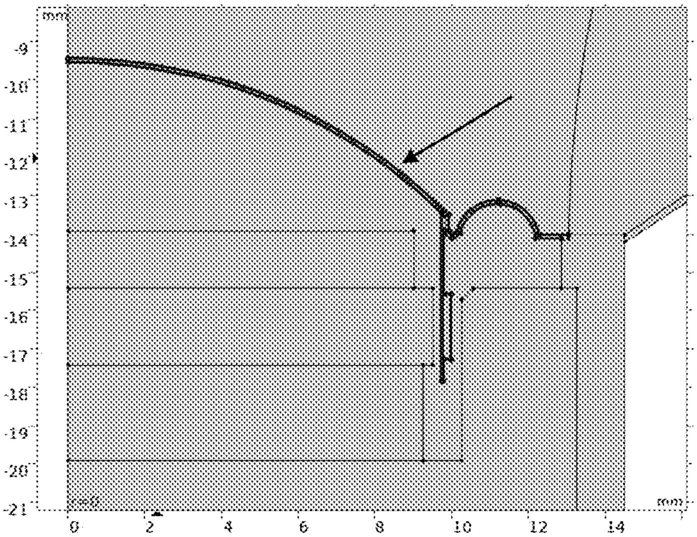
FIG. 18 shows the "Sound-Configuration" boundary.

*Lp*_0: 10*log 10(0.5*abs(pfar(0,1[*m*])[*Pa*])/\2/acpr.pref_*SPL*/\2);

*Lp*_the: 10*log 10(0.5*abs(pfar(0.707[*m*],0.707[*m*])[*Pa*])/\2/acpr.pref_*SPL*/\2);

*Lp_ave*_0: sum(with(*ka,Lp*_0),*ka*,1,21)/21;

*Lp_ave*_the: sum(with(*ka,Lp*_the),*ka*,1,21)/21;

In the above equations, Zb is the basic impedance of the tweeter unit; Zbr(freq) is the real part of the basic impedance; Zbi(freq) is the imaginary part of the basic impedance; i is the imaginary unit; FF is the load on the voice coil; BL is the driving force coefficient of the tweeter unit, which is 1.71[Wb/m]; V0 is the on-load voltage of the loudspeaker, which is 2.828[V]; solid.u_tZ is the expression of the axial vibration velocity of the loudspeaker voice coil; Lp_0 is the sound pressure level at one meter at the 0° axis of the loudspeaker; abs( ) is the modulo operator; pfar( ) is the far-field sound pressure solving operator, which will define the "Far-Field Calculation" in the subsequent steps; acpr-.pref_SPL is the reference sound pressure, which is 20 Micro Pascal; Lp_the is the sound pressure level at one meter at 45° off-axis of the loudspeaker; Lp_ave_0 is the average sound pressure level at one meter at 0° axis of the speaker; sum( ) is the summation operator, and with( ) is the sorting operator, ka is the serial number; Lp_ave_the is the average sound pressure level at one meter at 45° off-axis of the loudspeaker;

Step 4: defining the "Solid Mechanics" physical field interface, including: 1) setting "Fixed Constraint" at the thick line indicated by the arrow in FIG. 12; 2) setting "Body Load" at the voice coil indicated by the arrow in FIG. 13, setting the load type to "Total Force", and inputting FF in the z-axis direction; 3) setting "Damp" at the diaphragm indicated by the arrow in FIG. 14, and setting the damping type to "Isotropic Loss Factor";

Step 5: defining the "Pressure Acoustics, Frequency Domain" physical field interface, including: 1) setting "Outfield Calculation" at the thick line indicated by the arrow in FIG. 15; 2) setting "Internal Hard Sound Field Boundary (Wall)" at the thick line indicated by the arrow in FIG. 16; 3) setting "Perfect Matched Layer" on the region indicated by the arrow in FIG. 17;

Step 6: defining the "sound-structure boundary", as shown by the thick line indicated by the arrow in FIG. 18;

Step 7: setting the material parameters, including: 1) the air material parameters are from the COMSOL material database; 2) the material parameters of each component of the tweeter unit vibration system are shown in Table 1 below:

TABLE 1

| Material Parameters | | | | |
|---|---|---|---|---|
| Component | Young's modulus (Pa) | Density (kg/m^3) | Poisson's ratio | Loss factor |
| Diaphragm | 6e8 | 300 | 0.33 | 0.2 |
| Voice coil | 110e9 | 5500 | 0.35 | — |
| Frame | 1.1e9 | 1000 | 0.33 | — |

Figure 19:
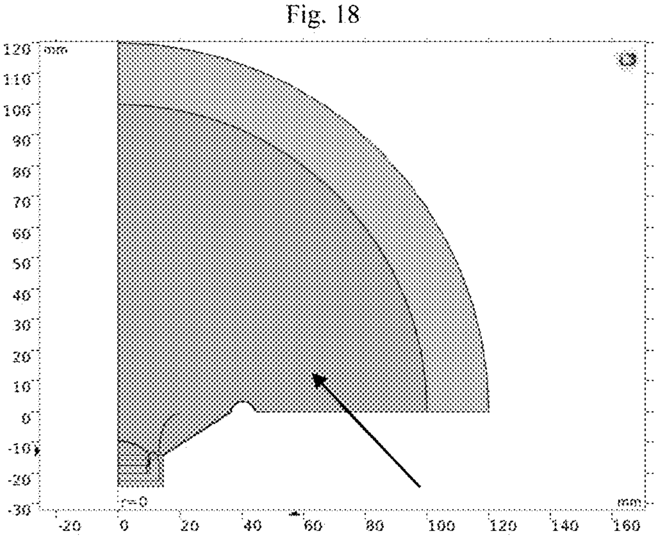
FIG. 19 shows the "Free Triangle Mesh" region.
Figure 20:
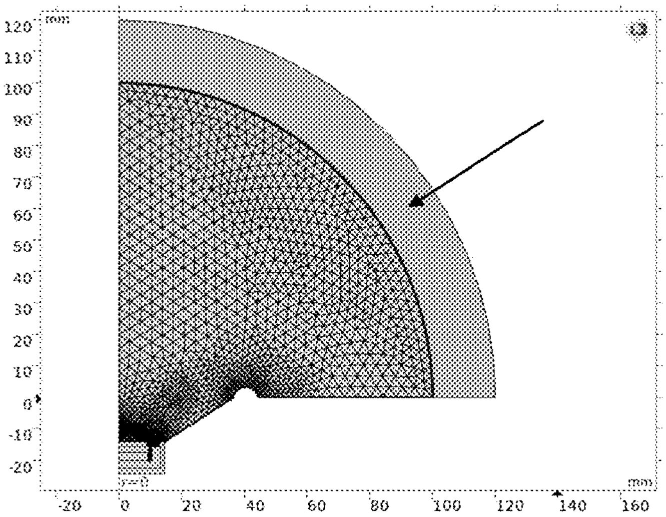
FIG. 20 shows a "mapped" mesh region.

Step 8: Mesh dividing, including: 1) dividing "Free Triangle Mesh" on the region indicated by the arrow in FIG. 19, and setting the maximum element size to "3431[m]/20000/5"; 2) dividing "mapping" mesh on the region indicated by the arrow in FIG. 20, setting the distribution number to "5"; and the final mesh division results are shown in Table 2 below:

TABLE 2

| Control variables and parameters | | | | |
|---|---|---|---|---|
| Parameter | Initial value | Zoom | Lower Limit | Upper Limit |
| P1r | 13.1[mm] | 1 | 13.2[mm] | 15.9[mm] |
| P1z | −10[mm] | 1 | −14[mm] | −7.1[mm] |
| P2r | 14[mm] | 1 | 16[mm] | 19.9[mm] |
| P2z | −0.5[mm] | 1 | −7[mm] | −0.6[mm] |

Figure 21:
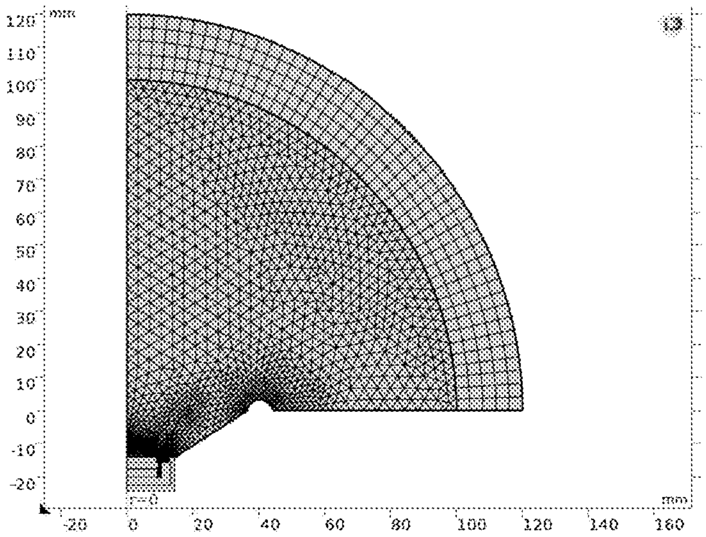
FIG. 21 shows meshing results.
Figure 22:
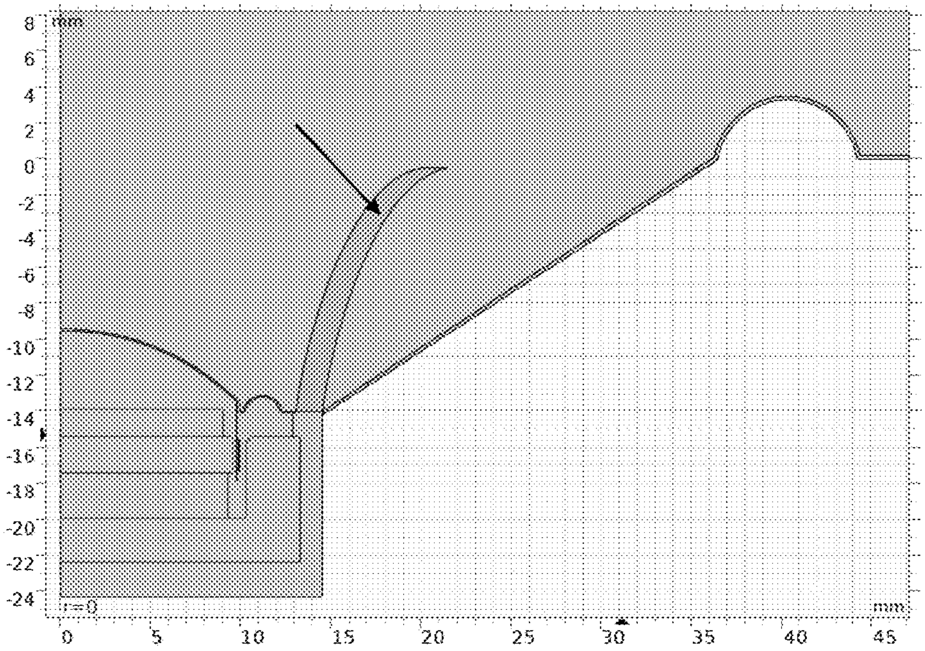
FIG. 22 shows the optimization results of the tweeter unit horn geometry model.

Step 9: setting the frequency range to 2000 Hz-20000 Hz, ⅙ octave;

Step 10: setting the optimization, including: 1) setting the optimization algorithm to "Nelder-Mead"; 2) setting the objective function to Lp_ave_0 and Lp_ave_the; 3) setting the objective function type to "Maximize"; 4) setting the value range of the optimization parameters, as shown in FIG. 21;

Step 11: left-clicking the "Calculate" button to view the calculation progress in the lower right corner of the software interface;

Step 12: reading the calculation results of the optimization parameters in the table column in the lower right corner of the software interface: (P1r, P1z)=(13.5, −10); (P1r, P1z)=(16, −1);

Step 13: drawing the geometric shape of the horn of the tweeter unit according to the calculation result of the optimized parameters, as shown by the region indicated by the arrow in FIG. 22.

The above method is suitable for moving coil type electrodynamic loudspeaker, moving yoke type loudspeaker and MEMS loudspeaker.

The above method designs the optimal Bezier curve shape of the horn through an optimization algorithm based on the three-field coupling simulation analysis technology of the loudspeaker magnetic circuit system, the vibration system and the sound field, so the present disclosure can quickly, cost-effectively and accurately optimize the loudspeaker horn, thereby shortening the development cycle of the loudspeaker horn and improving the acoustic performance of the loudspeaker.

The embodiments described above are only for illustrating the technical concepts and features of the present disclosure, and are intended to make those skilled in the art being able to understand the present disclosure and thereby implement it, and should not be concluded to limit the protective scope of this disclosure.

We claim:

1. A coaxial loudspeaker comprising:

a woofer unit;

a tweeter unit; and a horn having an inner cavity, an open upper end, and an open lower end, wherein the tweeter unit comprises:

a high-pitch cone, the horn surrounding the high-pitch cone, a lower end portion of the horn being connected to the tweeter unit, and an upper end portion of the horn having a largest inner diameter;

a seat, arranged on the woofer unit, the high-pitch cone being arranged on the seat, and the lower end portion of the horn being connected to the seat and/or an outer peripheral edge of the high-pitch cone;

a high-pitch voice coil; and a plurality of soldering terminals for transmitting an audio signal to the high-pitch voice coil, an upper portion of each of the plurality of soldering terminals being embedded in the seat and in contact and communicated with an inputting end of the high-pitch voice coil, and the plurality of soldering terminals being electrically connected to a signal inputting line for inputting the audio signal.

2. The coaxial loudspeaker according to claim 1, wherein the woofer unit comprises a bass voice coil, and a lead wire of the bass voice coil is electrically connected to the signal inputting line.

3. The coaxial loudspeaker according to claim 2, wherein the woofer unit comprises a magnetic circuit system, the magnetic circuit system is provided with a through hole extending in an up-down direction, the signal inputting line is inserted into the through hole, and a lower portion of each of the plurality of soldering terminals extends into the through hole to be electrically connected with the signal inputting line.

4. The coaxial loudspeaker according to claim 1, wherein the coaxial loudspeaker further comprises a dust ring connected between the horn and the woofer unit.

5. The coaxial loudspeaker according to claim 4, wherein the woofer unit comprises a bass cone, and the dust ring is connected between the upper end portion of the horn and the bass cone.

6. The coaxial loudspeaker according to claim 1, wherein the woofer unit comprises a bass voice coil, the tweeter unit is arranged within a woofer voice coil, and an uppermost end of the tweeter unit and an upper end of the horn are lower than an upper end of the woofer unit.

7. The coaxial loudspeaker according to claim 1, wherein the coaxial loudspeaker further comprises a plurality of fins extending inwardly from an inner surface of the horn, and the plurality of fins are located above the high-pitch cone of the tweeter unit.

8. The coaxial loudspeaker according to claim 7, wherein the plurality of fins extend radially inward of the horn, and a radial dimension of each of the plurality of fins gradually increases from top to bottom.

9. The coaxial loudspeaker according to claim 8, wherein a lower end portion of each of the plurality of fins is connected to an annular member.

10. The coaxial loudspeaker according to claim 1, wherein the horn further comprises an expansion portion, the expansion portion is lower than the upper end portion of the horn, and an inner diameter of the expansion portion increases gradually from bottom to top.

11. The coaxial loudspeaker according to claim 1, wherein an inner diameter of the horn increases gradually from bottom to top.

12. The coaxial loudspeaker according to claim 11, wherein a whole or a part of an inner contour of a cross section of the horn in an up-down direction is in a shape of a Bezier curve.

13. The coaxial loudspeaker according to claim 1, wherein a part of a lower end surface of the horn has an arched portion that is arched upward, and an edge portion of the high-pitch cone is located below the arched portion with an annular cavity communicating with the inner cavity is formed therebetween.

14. A shape optimization method for a coaxial loudspeaker with a horn, comprising the following steps:

S1, establishing a geometric model of the coaxial loudspeaker, and obtaining control nodes in a contour curve of the horn;

wherein the coaxial loudspeaker comprises:

a woofer unit;

a tweeter unit; and a horn having an inner cavity, an open upper end and an open lower end, and wherein the tweeter unit comprises a high-pitch cone, the horn surrounds the high-pitch cone, a lower end portion of the horn is connected to the tweeter unit, and an upper end portion of the horn has a largest inner diameter;

S2, setting a physical field;

S3, defining material parameters;

S4, dividing a mesh;

S5, optimizing geometric parameters of a contour shape of the horn; and

S6, drawing an optimized geometric model of the horn according to optimized parameters, wherein step S5 comprises:

S51, selecting optimization parameters: taking coordinate values P of a group of control nodes in the contour curve of the horn as the optimization parameters;

S52, setting constraints: limiting value range C of coordinate values P to:

$$C=\{P:lb\leq P\leq ub\}$$

where lb is a lower limit of the coordinate values P, and ub is an upper limit of the coordinate values P;

S53, determining optimization objective: taking a maximum value of a sum of high-frequency average sound pressure level responses $\overline{SPL^0}$ and $\overline{SPL^\theta}$ of the coaxial loudspeaker at 0° on axis and off-axis θ angles, that is, satisfying:

$$\check{P}=\underset{P}{\underline{\max}}\left(\overline{SPL^0}+\overline{SPL^\theta}\right)$$

where $\check{P}$ is a set of optimization parameters that satisfy the optimization objective and $$\underset{P}{\underline{\max}}$$

is an operator to serve un maximum value; and

S54, optimizing calculation: according to the coordinate values P and the constraint, using an optimization algorithm to calculate the set of optimization parameters P̌ that satisfy the optimization objective $$\max_{P}\left(\overline{SPL^{0}} + \overline{SPL^{\theta}}\right).$$

15. The shape optimization method according to claim 14, wherein step S2 comprises:

S21, electromagnetic field and vibration system: setting fixed parts of loudspeaker vibration system components to "Fixed Constraints", setting material constitutive relation of the loudspeaker vibration system components to "Linear Elastic material Model", and setting an axial load FF on a loudspeaker voice coil as follows:

$$FF = BL * \frac{V_0 - BL * v}{Zb(freq)}$$

where BL is driving force coefficient of a loudspeaker magnetic circuit, Zb(freq) is basic impedance frequency response curve of the loudspeaker magnetic circuit, v is axial vibration velocity of the loudspeaker voice coil, and $V_0$ is on-load voltage of the coaxial loudspeaker; and S22, sound field: setting a geometric model of the contour curve of the horn as "Hard Sound Field Boundary", setting an outer layer of an air domain around the coaxial loudspeaker as "Perfect Matched Layer".

* * * * *